Sept. 12, 1933.  J. W. LYNCH  1,926,910
HOUSEHOLD MIXER
Filed June 23, 1932  3 Sheets-Sheet 1
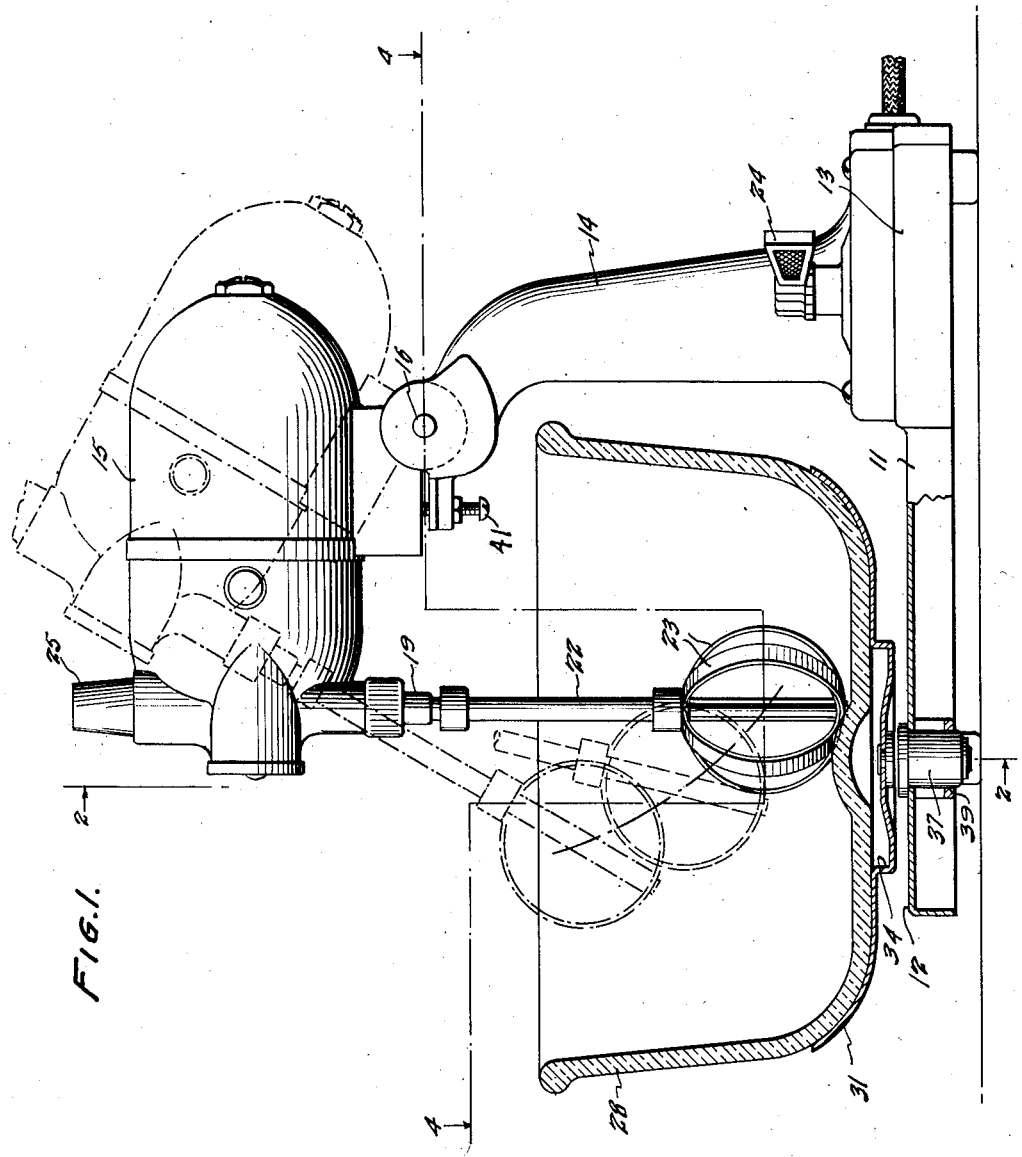

Sept. 12, 1933.    J. W. LYNCH    1,926,910
HOUSEHOLD MIXER
Filed June 23, 1932    3 Sheets-Sheet 2
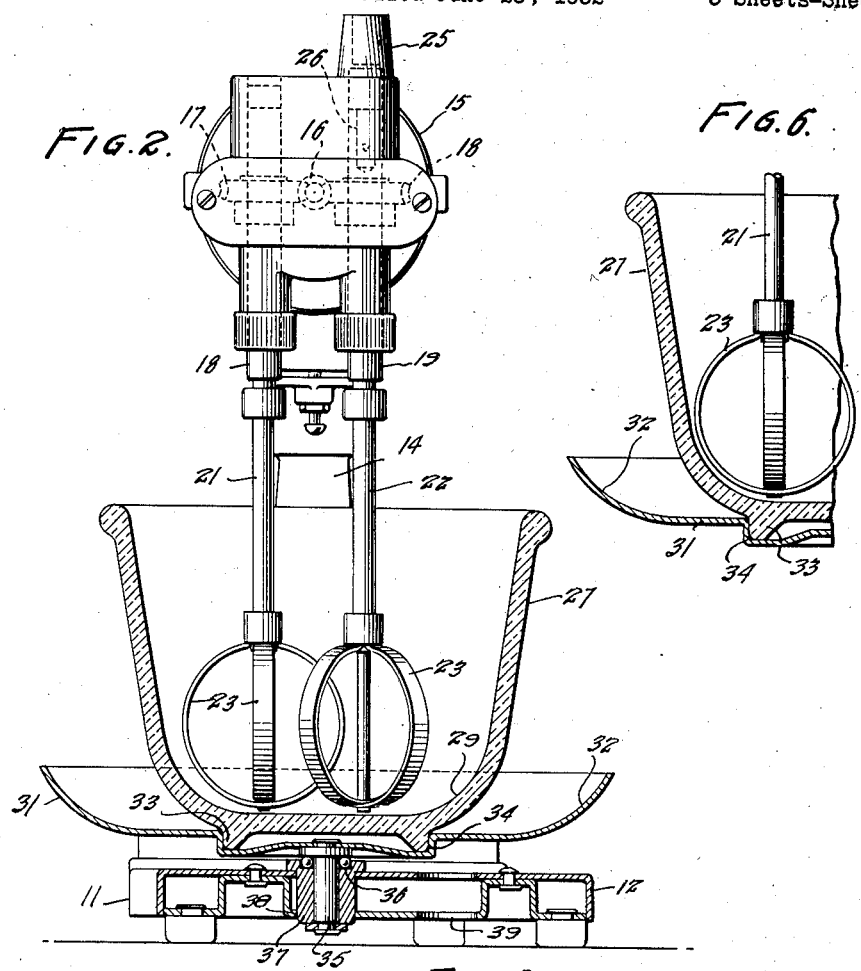
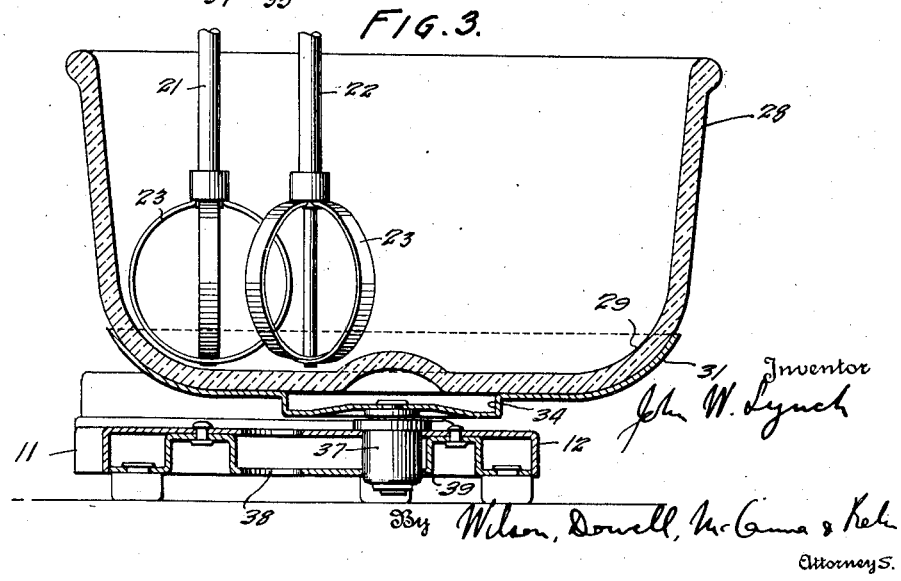

Sept. 12, 1933.　　　　J. W. LYNCH　　　　1,926,910
HOUSEHOLD MIXER
Filed June 23, 1932　　　3 Sheets-Sheet 3

Inventor
John W. Lynch
Wilson, Dowell, McKenna & Rehm
By
Attorneys

Patented Sept. 12, 1933

1,926,910

UNITED STATES PATENT OFFICE 1,926,910

HOUSEHOLD MIXER

John W. Lynch, Chicago, Ill., assignor to Chicago Flexible Shaft Company, Chicago, Ill., a corporation of Illinois Application June 23, 1932. Serial No. 618,975

19 Claims. (Cl. 259—84)

This invention relates to household mixers.

One of the objects of my invention is to provide for more efficient mixing and beating of comestibles and beverages.

Another object is to facilitate the use of mixers of this class by the provision of improved co-relation of the beater element or elements and any of a plurality of mixing bowls of different sizes. This improved relationship makes for quicker and better mixing and beating operations; and it also makes for a wider range of use of the mixer in culinary operations.

In furtherance of my object of obtaining improved efficiency and greater utility in a household mixer, I have provided a novel combination and arrangement of parts described more fully hereinafter, whereby more even and thorough mixing of batters and the like is obtained, under predetermined conditions, giving better consistency to the mixture and better grain or texture to the resultant product.

My invention also provides novel structural features and characteristics which promote economy in the cost of manufacture of mixers of this class and at the same time provide improved practicability of such mixers.

Among the objects of my invention are, briefly stated, provision for mounting a large and a small mixing bowl on different centers in a plane extending crosswise of the major axis of the mixer, or for effecting relative shifting between the beater unit and the bowls in said crosswise plane, whereby to obtain certain new and desirable results described hereinafter; to provide a substantial and stable support for a large mixing bowl, preferably in the form of a platform or turntable, and to provide for concentrically supporting a small mixing bowl on said platform; to mount the platform or turntable in off-center relation to the beater unit so as to obtain a close-coupled assembly with its attendant advantages; to provide a practical and efficient mounting for the turntable in order to insure the least frictional resistance to rotation thereof, thereby promoting better functioning of a mixer embodying the principles of my invention; and to provide for more thorough and complete mixing at different levels, particularly in the large mixing bowl.

Other objects and attendant advantages will be appreciated as the invention becomes better understood by reference to the following description when considered in connection with the accompanying drawings, in which:

Figure 1 is a side elevation of a mixer embodying my invention, showing in section a large mixing bowl on the turntable, and showing in dotted lines the beater unit tilted to different elevations;

Fig. 2 is a vertical section taken substantially on the line 2—2 of Fig. 1, showing the small mixing bowl in position;

Fig. 3 is a similar view, partly broken away, showing the large mixing bowl in position;

Fig. 6 is a detail section taken on the line 6—6 of Fig. 5.

Figure 4:
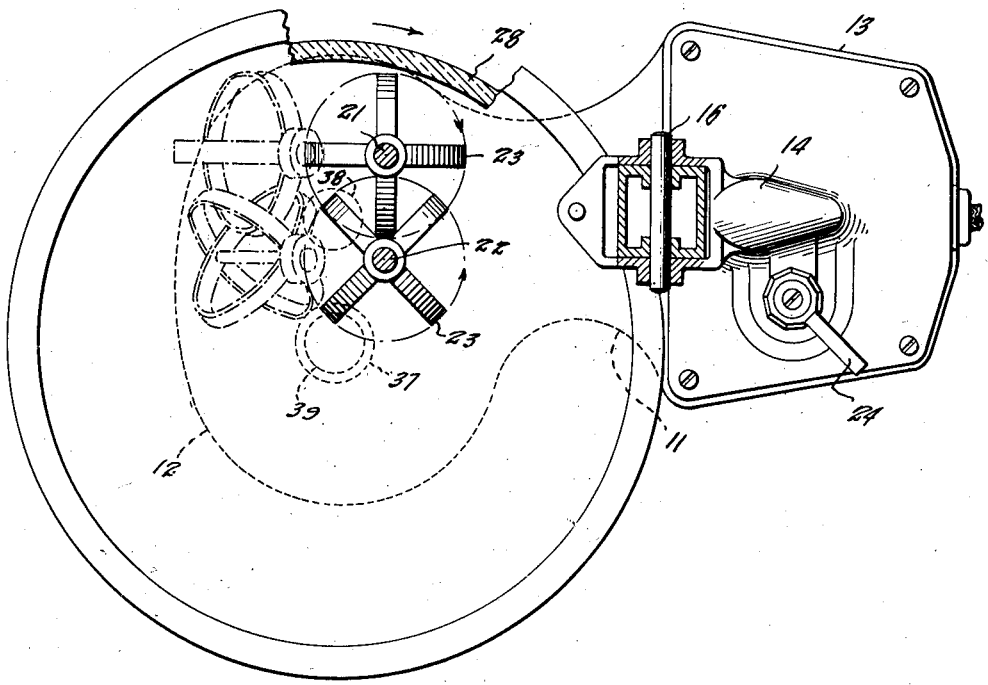
Fig. 4 is a horizontal plan view, partly in section, taken substantially on the line 4—4 of Fig. 1, showing in dotted lines an elevated position of the beaters.

My invention may be considered as embodying several phases, one of which resides in certain combinations of elements, particularly in respect to the functional relationship of the beaters and the mixing bowls, in which my invention provides for free rotation of large and small mixing bowls interchangeably, concentrically mounted and for effecting relative shifting horizontally between the beaters as a unit and said mixing bowls from an operative position for the large bowl to an operative position for the smaller bowl, in each such position one of the beaters being located in close proximity to the bottom and side corner wall of the bowl and the other beater being more remote from said wall. The bottom and side corner wall of each bowl is similarly curved and the beaters have a like curvature, so that in view of said shape and close proximity in each said position the beaters serve to rotate each bowl containing fluid contents such as batters and liquids of the kinds contemplated by this invention, such rotation being controlled by the propelling action of the beater closer to said corner wall and the retarding counteraction of the beater more remote therefrom. Furthermore, substantially the full fluid contents within the level of the beaters is carried through the same by said rotation of the bowls. This rotation of the bowls and movement of the fluid contents through the beaters is especially desirable in the mixing of cake batters and in the preparation of certain ingredients in culinary operations, as well as in whipping and beating of certain ingredients where time is a factor and uniform consistency is desired. If the ingredients are not uniformly mixed, some portions will be of different consistency and, furthermore, if the beating is carried on too long in order to sufficiently mix, then there is the tendency in some cases because of the nature of the ingredients, to make a tough mixture. With the principles of my invention the mixing is done evenly and thoroughly and in a comparatively short time by the use of a single appliance constructed for interchangeable use of large and small mixing bowls so that predetermined results may be obtained within the quantity range desired for an appliance of this kind. Another phase of my invention is in respect to the crosswise off-center relation of the mixing bowls and the beater element. Both of said phases I consider to be broadly new in this art, and they are so claimed herein. Another phase of my invention is in respect to certain structural features in the nature of a preferred embodiment or species, likewise claimed herein. It should also be borne in mind that my invention contemplates improvements making for greater utility and practicability of a mixer for household culinary purposes, although obviously not limited to household use; and to this end my improvements are particularly well adapted for mixing all sorts of batters, salad dressings and the like, cutting and mashing potatoes and other vegetables, beating eggs, whipping cream, and mixing beverages. In these various uses it is desirable under the particular circumstances to use mixing bowls of different sizes and to this end my invention contemplates the use of a large and a small mixing bowl functioning with the beater element in a novel manner as will be presently more fully described. It should be understood, however, that mixing bowls of other shapes as well as other vessels may be used with the mixer, and that my invention in all of its phases is not limited to the particular mixing bowls herein disclosed.

Referring more particularly to the drawings, my invention contemplates the use of a suitable base designated generally by 11, having a bowl supporting portion 12 at one end and a motor supporting portion 13 at the opposite end. The base is preferably elongated and has a major axis extending in the direction of the portions 12 and 13 above mentioned. The base portion 12 is preferably unobstructed on its top surface so that it is adapted to receive and support mixing bowls and vessels of different sizes and shapes.

On the base portion 13 is carried a suitable upright standard designated by 14 on which is mounted a motor and beater unit designated generally by 15. Said unit is equipped with one or more rotary beater shafts driven by the motor and arranged in a vertical operating position above the bowl supporting portion 12. I prefer to use an electric motor close-coupled with the beater element and so mounted that it overreaches the bowl supporting portion; in other words, the beater unit and the upright standard are so arranged that the beater unit is supported in an overhanging position, allowing ample room for mounting of a large mixing bowl close to the standard. I have also provided for mounting the motor and beater unit on the upright standard with capacity for vertical adjustment thereon in order to position the beater element at different elevations in the mixing bowl, this movement being obtained in the present instance by mounting the motor unit to tilt about a horizontal pivot 16 on the standard 14. In this embodiment the electric motor is normally on a horizontal axis parallel with the major axis of the machine and the motor shaft is equipped with a drive pinion 16 meshing with the gears 17 and 18 fixed respectively to beater drive elements 18 and 19 journalled in the casing forming a part of the motor unit. Beaters 21 and 22 are removably mounted in and driven by the drive elements 18 and 19 respectively in any suitable manner as, for example, as shown in the application of H. M. A. Strauss, Serial No. 561,578. Each beater preferably comprises a shank or shaft portion which connects at the upper end to its drive element, and a plurality of beating elements or blades 23 radiating from the shaft and being of curved or circular form, particularly from the lowermost point outwardly and upwardly so as to traverse a curved path conforming to the curvature of the bottom and side wall of a mixing bowl. The beaters may be termed as of the ring or loop type. These beaters are spaced apart laterally, crosswise of the motor axis and of the said major axis of the machine, and the beater elements are so constructed and arranged as to operate in overlapping relation, the blades of one beater element alternating with those of the other beater element in the common area traversed by the blades, this obviously necessitating rotation of the beater elements in opposite directions. The speed of rotation is controlled by the motor speed through operation of a control lever 24 so that the beaters may be rotated either at a slow speed or at a high speed, or intermediate speeds, according to the nature of the work, it being noted that these speeds are preferably all of higher revolutions per minute than the speed of a dough mixer.

The motor unit is designed to carry and to drive a juice extractor in accordance with the invention disclosed in the Strauss application above mentioned, in this instance the juice extractor bowl being mounted on a boss 25 on the motor unit and the reamer or juice extracting cone being driven by the upper end of the drive element 19 which has a socket 26 shown in dotted lines in Fig. 2 for receiving the reamer shaft.

Figure 5:
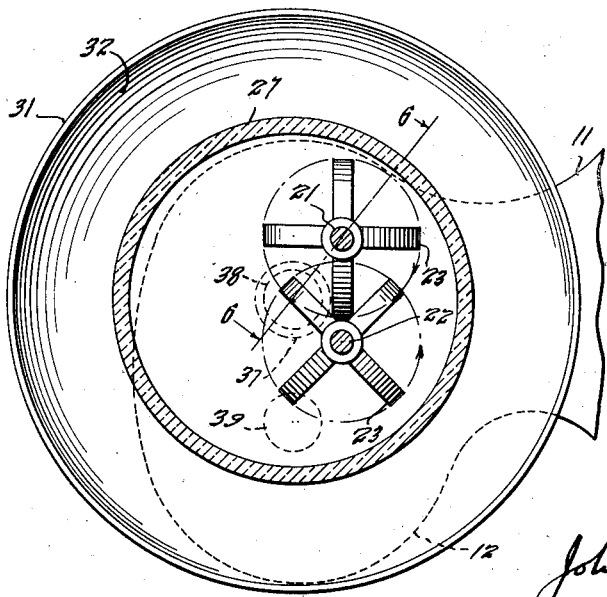
Fig. 5 is a similar horizontal plan view, partly broken away, showing the small mixing bowl in position.

The mixing bowls above referred to comprise a bowl 27 of comparatively small diameter and a bowl 28 of comparatively large diameter. As shown in Figs. 2 and 3, each of these bowls is shaped to curve outwardly and upwardly in the corner portion 29 conforming substantially to the bottom curvature of the beater element 23 so that when this beater is located in predetermined relation to this curved bottom and side wall, certain functions will be obtained as will be presently described. The relationship referred to is best shown in Figs. 4 and 5, the former showing the relation of the large mixing bowl to the beaters and the latter showing the similar relation of the small mixing bowl thereto. From these views it will be noted that the bowls are positioned in an off-center relation to the beaters and with the beater 21 located in each instance in close proximity to the side wall of the bowl. It will also be noted that the centers of the large and small bowls respectively are spaced apart in a plane extending crosswise of said major axis and that this plane is, in the preferred embodiment, parallel with and in close relation to a plane connecting the beater axes. The word "crosswise" is used herein and in the claims to broadly define any horizontal plane transverse to the major or longitudinal axis of the base. By reason of this relative arrangement of the beaters and the bowls, each bowl when in operative position and when mounted with capacity to rotate freely, will be rotated by the action of the blades of the beater 21 on the contents of the bowl, causing a frictional pull in a clockwise direction, viewing Figs. 4 and 5, and turning the bowl in this direction. It should also be noted that the beater 22 rotating in the opposite direction sets up a counter action but that inasmuch as this beater is spaced farther from the side wall of the bowl, this counter action will merely have a retarding effect which is beneficial in that it prevents too rapid rotation of the bowl. In view of the high speed at which the beaters are operated under some conditions, rapid rotation of the bowl would be objectionable because centrifugal force would tend to throw the contents from the bowl. The counter rotation of the beater 22 has, therefore, a controlling function with respect to the speed of rotation of the bowl and is also advantageous in that its counter action with the beater 21 promotes more thorough mixing and beating. It will be further noted, viewing Fig. 4, that the beaters traverse substantially the entire radial area of the bowl so that practically the entire body of material is carried into the path of the beaters by rotation of the bowl. This condition prevails in both bowls and is a factor in promoting efficient and thorough mixing. It should be further noted that with this off-center relation of the bowls with respect to the beaters, the latter may be raised to different elevations in the bowl as shown in Fig. 1 and in such positions they traverse substantially the same radial area and consequently perform the most efficient mixing at any of these elevations. Another advantage of this arrangement is that in moving from the lower position to the upper position, the outermost beater follows closely along the side wall of the bowl and thus serves to clear off and bring into the mix any ingredients that have accumulated thereon.

In the present embodiment of my invention I obtain the bowl and beater relationship above described by the provision of a single platform of turntable adapted to concentrically support either the large or the small bowl and adapted to be shifted between two extreme positions in one of which the large bowl is positioned as shown in Fig. 4 and in the other the small bowl is positioned as shown in Fig. 5. This turntable designated generally by 31 is of substantially the same diameter as the large mixing bowl and provides a wide annular seat 32 conforming to the bottom curvature of the large bowl and serving as a substantial and stable support for holding said bowl against lateral displacement from its center when being rotated. The central portion of the turntable, together with the bottom of the small mixing bowl, are so shaped that one interfits with the other to retain the small bowl concentrically on the turntable. In the preferred embodiment, the small bowl is provided with a depending annular flange 33 which seats in an annular depression 34 in the turntable, thus securely holding the small bowl concentrically on the turntable. In the preferred embodiment of my invention, I provide a turntable with a fixed depending center spindle 35 and on this I mount an anti-friction bearing 36 the outer casing 37 of which is retained on the spindle so as to constitute a part of the turntable assembly and be removable with the same. This bearing member 37 is elongated and adapted to fit snugly in either of two sockets 38 and 39 in the bowl supporting portion of the base. The bearing member 37 is held against rotation by reason of its frictional engagement in the socket and the anti-friction bearing carries the weight of the turntable and its load and enables free rotation thereof with the least frictional resistance. Inasmuch as frictional pull of the contents on the walls of the bowl (as a function of the beaters) is relied upon for turning the bowl, it is desirable to maintain a uniformly minimum resistance in the mounting of the turntable. This is obtained by the single spindle and the anti-friction bearing retained thereon, it being noted that the turntable proper serves to protect the bearing from liquid and batter drippings when in the operative position. When the turntable is removed the bearing is carried with it. This is particularly desirable since, if the bearing were retained in the base, it would be exposed to drippings and other foreign substances.

When changing bowls the motor unit will be tilted back to withdraw the beaters. The shifting of the turntable from one position to the other when changing the bowls is obvious.

The present embodiment of my invention in respect to the relative shifting of the bowl positions and the beaters is desirable for the reason that the socket positions 38 and 39 are definitely located so as to position each of the mixing bowls (when one or the other is mounted on the turntable) in predetermined relation to the beaters, substantially as shown, so that efficient mixing will be obtained without trial or experiment. Thus, no particular skill or knowledge on the part of the operator is required and recipes may be followed for mixing in the large or the small bowl without further attention to the position of the beaters with respect to the bowls. The beaters should, however, be in a lowermost position without striking the bowls, as determined by the adjustment 41. This adjustment need be set only once, unless it is desired to lower the beaters for mixing in a bowl or vessel resting directly on the bowl-supporting portion 12.

From the foregoing it will be apparent that my invention in its broader aspect provides for rotation of both the large and small mixing bowls by reason of the functional relationship between the oppositely rotating beater elements and the bowls in the respective positions as a result of the relative shifting or changing of position between the respective bowls and the beater elements as a unit. This makes for improved efficiency and greater utility for the reason that the mixture is carried through the beaters and the beaters are so arranged as to more evenly and thoroughly mix the ingredients in a shorter period of time than heretofore with prior devices. Better and more satisfactory results are therefore obtained in the following of recipes than with the use of prior devices with which a great deal was left to the skill and knowledge of the operator in the handling and manipulating of such devices. With my invention the various mixing, beating and whipping operations necessary in making cakes are more efficiently performed and with predetermined and more uniform results. Furthermore, my invention is adapted for a wider range of uses such as in cutting, mashing and whipping potatoes and other vegetables. It is also well adapted for mixing beverages of all sorts and for mixing mayonnaise and other salad dressings.

Among the new results incidental to the off-center location of the mixing bowls is that a shorter base and more compact machine is obtained as compared with shifting the bowls in a plane parallel with the major axis of the machine. This will be apparent, since no space is required lengthwise of said axis for shifting the bowls and the large bowl may be located in close relation to the upright standard. The use of two beaters of uniform size is also desirable from a cost viewpoint and also because they are equally interchangeable. These beaters operate in a new relationship to the mixing bowls, as above described, and function to obtain better turning of the bowls and control of such turning, and also to obtain more efficient mixing at all levels in the bowls. This latter function is particularly advantageous. In many cases, especially with full bowls, or where all possible speed is required, or in cutting and mashing potatoes and the like, the operator may grasp the motor unit and swing it back and forth to pass the beaters through the whole mixture from top to bottom thereof or through any selected level. To do this with beaters arranged in line parallel to the longitudinal axis of the base would mean that the beater farther away from the fulcrum would operate in a higher level than the beater near the fulcrum, or it would run idle above the mixture and tend to throw the material while the other beater is in the mixture. Furthermore, only a ring of the approximate width of either beater would be worked upon at a time. According to this phase of my invention, both beaters travel out of and enter the mixture simultaneously; furthermore, substantially the full radial cross-section of the material is worked at all levels due to the fact that this material is being moved to the beaters by rotation of the bowl and the combined width of the two beaters approximate the radius of the large bowl and extend beyond the radius of the small bowl when interchangeable bowls are used. These features promote better efficiency and make for greater practicability and usefulness.

It should be understood that the several features of my invention may be applied in other embodiments to produce the same or equivalent results without departing from the spirit and scope of the invention defined in the following claims, in which—

I claim:

1. In a mixer, the combination of an elongated base having a bowl-supporting portion at one end and a motor-supporting portion at the opposite end, an upright standard on said motor-supporting portion, an electric motor mounted on said standard in a position overreaching the bowl-supporting portion and equipped with a pair of depending vertical beaters spaced apart crosswise of the major axis of the base, a large and a small mixing bowl, a turntable constructed for carrying either of said bowls concentrically thereon, and means to support the turntable on said bowl-supporting portion in either of two positions spaced apart crosswise of said major axis to position either of the bowls in off-center relation to the beaters and with the side wall of either bowl in close proximity to the outermost beater, the turntable being freely rotatable in each said position, whereby each bowl when concentrically mounted on the turntable will be rotated by the action of the beaters on the contents of the bowl, said motor and beaters constituting a unit mounted on said standard to tilt about a horizontal axis extending crosswise of said major axis, whereby the beaters are maintained at the same level with respect to each other at any position to which they may be tilted.

2. In a mixer, the combination of an elongated base having a bowl-supporting portion at one end and a motor-supporting portion at the opposite end, an upright standard on said motor-supporting portion, an electric motor unit mounted on said standard in a position overreaching the bowl-supporting portion and equipped with a pair of depending vertical beaters spaced apart crosswise of the major axis of the base, a large and a small mixing bowl, a turntable constructed for carrying either of said bowls concentrically thereon, and means permitting relative shifting between the turntable and the beaters in a plane extending crosswise of said major axis to position either of the bowls in off-center relation to the beaters and with the side wall of either bowl in close proximity to the outermost beater, the turntable being freely rotatable in each said position, whereby each bowl when concentrically mounted on the turntable will be rotated by the action of the beaters on the contents of the bowl, said motor unit being mounted on said standard to tilt about a horizontal axis extending crosswise of said major axis, whereby the beaters are maintained at the same level with respect to each other at any position to which they may be tilted.

3. In a mixer, the combination of a base having a bowl-supporting end and a motor-supporting end, the relationship of said ends defining the major axis of the base, a motor on said motor-supporting end, a pair of vertical, rotary beaters positioned over said bowl-supporting end and driven by the motor, said beaters being laterally spaced apart in a plane extending crosswise of said major axis, a large and a small mixing bowl, and means for supporting either bowl on said bowl-supporting end of the base and for effecting relative shifting between the beaters and the bowls in a plane extending crosswise of the major axis of the base to position either bowl in cooperative relation to the beaters with the outermost beater in proximity to the side wall of the respective bowl and the inner beater further spaced from the side wall of such bowl, each bowl being freely rotatable when in said cooperative relation to the beaters so as to be rotated by the action of the beaters on the contents of the bowl, the beaters being mounted for movement on said standard to tilt about a horizontal axis extending crosswise of said major axis, whereby the beaters are maintained at the same level with respect to each other at any position to which they may be tilted.

4. In a mixer, the combination of a beater unit including a horizontal electric motor and a pair of vertical beaters laterally spaced apart in a plane extending crosswise of the motor axis, said beaters being driven by the motor, a large and a small mixing bowl, and means providing mounting for the mixing bowls to support either in cooperative relation to the beaters, each with its side wall in close proximity to the outermost beater and with the centers of the bowls spaced apart in a plane extending crosswise of said motor axis, each bowl being freely rotatable when in said cooperative relation to the beaters so as to be rotated by the action of the beaters on the contents of the bowl, said beater unit being mounted to tilt about a horizontal axis extending crosswise of said motor axis, whereby the beaters are maintained at the same level with respect to each other at any position to which they may be tilted.

5. In a mixer, the combination of a beater unit including a horizontal electric motor and a pair of vertical beaters laterally spaced apart in a plane extending crosswise of the motor axis, said beaters being driven by the motor, a large and a small mixing bowl, a turntable constructed for carrying either of said bowls concentrically thereon, and means for supporting the turntable in either of two positions to position either bowl in cooperative relation to the beaters, each with its side wall in close proximity to the outermost beater and with the centers of the bowls spaced apart in a plane extending crosswise of said motor axis, each bowl being freely rotatable when in said cooperative relation to the beaters so as to be rotated by the action of the beaters on the contents of the bowl, said beater unit being mounted to tilt about a horizontal axis extending crosswise of said motor axis, whereby the beaters are maintained at the same level with respect to each other at any position to which they may be tilted.

6. In a mixer, the combination of a pair of vertical beaters each having radial blades and being laterally spaced apart with the blades in overlapping relation so that the blades of one beater alternate with those of the other in the overlapping area when rotated in opposite directions, means for so rotating the beaters, a large and a small mixing bowl interchangeably mounted in cooperative relation to the beaters, the large bowl being mounted for free rotation about a vertical axis, the beaters being disposed within the bowl with one beater located adjacent to the center axis of the bowl and the other beater located adjacent to the side wall of the bowl, and the small bowl being mounted for free rotation with its center axis located intermediate the beater axes, and a base upon which the beaters and the bowls are adapted to be mounted, the bowls on one end and the beaters on the opposite end, such relationship of the bowls and the beaters mounting defining the major axis of the base, the beater axes being spaced apart in a plane extending crosswise of said major axis and the bowl centers being likewise spaced apart in a plane extending crosswise of said major axis.

7. In a mixer, the combination set forth in claim 6, including a single turntable for concentrically supporting either of said bowls and being shiftable in said plane crosswise of the major axis of the base for supporting the respective bowls in said relation to the beaters.

8. In a mixer, the combination set forth in claim 6, including means for tilting the beaters about a horizontal axis extending crosswise of the major axis of the base whereby to position the beaters at different operating levels in either bowl in the above defined relation of the bowl to the beaters.

9. In a mixer, the combination of a turntable having an annular seat of comparatively large diameter to receive and hold a large mixing bowl and having an annular seat of smaller diameter concentric with respect to the first mentioned seat to receive and hold a small mixing bowl when the large mixing bowl is removed, a rotary beater, and means to effect relative shifting between the beater and the turntable to position the beater in approximately the same cooperative relation to the side wall of each mixing bowl when one or the other of said bowls is supported on the turntable.

10. In a mixer, the combination of a pair of overlapping rotary beaters having a beater element shaped to curve outwardly and upwardly from a lowermost center point, a mixing bowl of comparatively small diameter having its bottom and side wall joined by a corner curved outwardly and upwardly conforming substantially to the curvature of said beater and having an annular base flange depending from said curved corner portion, a mixing bowl of comparatively large diameter having its bottom and side wall joined by a corner curved outwardly and upwardly conforming substantially to the curvature of said beater, a turntable having an annular seat to receive the base flange of said small bowl to hold it concentrically on the turntable and having an annular seat of larger diameter to receive the base of the large bowl to hold it concentrically on the turntable, means for supporting the turntable for rotation about an axis concentric with respect to said annular seats, said beaters having a combined width approximating the radius of the large bowl, and means to effect relative shifting of said beaters and turntable to locate one beater in cooperative relation with the corner curvature of either the small or the large bowl and the other beater, near the center of such bowl, depending upon which is supported on the turntable.

11. A mixer comprising a base having a bowl supporting portion, a turntable adapted to carry a mixing bowl and having a fixed, depending spindle, an antifriction bearing on the spindle, said bowl supporting portion having a socket adapted to receive said bearing and to hold the turntable in position for rotation in the bearing, and a rotary beater supported on the base to operate in a mixing bowl on the turntable, the turntable serving to prevent batter and other liquid drippings from entering said bearing, and means maintaining said bearing in operative position on the spindle at all times so that the bearing will be retained with the spindle when the turntable is removed from the base.

12. A household mixer for batters and liquids, having a large and a small mixing bowl each having a similarly curved bottom and side corner wall, a turntable having an annular seat of comparatively large diameter to receive and hold said large mixing bowl and having an annular seat of smaller diameter concentric with respect to the first-mentioned seat to receive and hold said small mixing bowl when the large bowl is removed, a pair of vertical rotary beaters in overlapping relation, each shaped to conform to the curvature of said corner wall and adapted to be positioned in either of said bowls in close proximity thereto, means for rotating the beaters in opposite directions, the beaters as a unit and said bowl mounting being relatively shiftable horizontally with respect to each other to effect a cooperative relation between the beaters and the large bowl in one position and a cooperative relation between the beaters and the small bowl in another position, in each such position one of the beaters being in said close proximity to said corner wall of the bowl for causing rotation of the bowl by action of the fluid contents thereon and the other beater being more remote from said wall and counteracting the effect of the first beater, whereby each bowl is rotated by the propelling and retarding forces of said beaters on the fluid contents and substantially the full body of said contents within the level of said beaters is carried through the same.

13. A household mixer for batters and liquids, comprising a base having a bowl-supporting end and a motor-supporting end, a large and a small mixing bowl, each having a similarly curved bottom and side corner wall, a turntable, means whereby either of said bowls is held concentrically on said turntable when the latter is mounted in an operative position on said bowl-supporting end of the base, an electric motor unit, means for supporting said motor unit on said motor-supporting end of the base with the motor above and overreaching said bowl-supporting end, a pair of vertical beater shafts carried and driven in opposite directions by said motor unit and each equipped at its lower end with a beater element shaped to conform to the curvature of said corner wall, said beater elements being in overlapping relation, and means supporting the turntable for free rotation on the base, the turntable and the beaters being relatively shiftable horizontally with respect to each other to effect a cooperative relation between the beaters and the large bowl in one position and a cooperative relation between the beaters and the small bowl in another position, in each such position one of the beaters being in close proximity to said bottom and side corner wall of the bowl for causing rotation of the bowl by action of the fluid contents thereon and the other beater being more remote from said wall and counteracting the effect of the first beater, whereby each bowl is rotated by the propelling and retarding forces of said beaters on the fluid contents and substantially the full body of said contents within the level of said beaters is carried through the same, said motor unit being mounted with capacity for movement on said motor-supporting end to move the beaters back and forth from top to bottom of the mixture for working all levels thereof, both beaters simultaneously traveling into and out of the mixture, and the mixture always being worked upon at any level by the combined width of the two beaters.

14. A household mixer comprising a base having a bowl-supporting portion at one end and a motor-supporting portion at the opposite end, a mixing bowl mounted for free rotation about a vertical axis on said bowl-supporting portion, an electric motor mounted on said motor-supporting portion, a pair of vertical beaters on parallel axes spaced apart in a plane extending crosswise to the longitudinal axis of the base, with the beater elements in overlapping relation, one being located in the bowl near the side wall thereof and the other near the center so that the combined width of the two beaters approximates the radius of the bowl, means driven from the motor for rotating the beaters in opposite directions whereby the bowl will be rotated by the action of the beaters on the fluid contents and whereby substantially the entire contents from the center to the side wall of the bowl within the level of the beaters will be continuously moved into the beaters, the beaters being mounted for tilting during operation about a horizontal axis extending crosswise to said longitudinal axis whereby to move the beaters back and forth from top to bottom of the mixture for working all levels thereof, both beaters simultaneously traveling into and out of the mixture, and the mixture always being worked upon at any level by the combined width of the two beaters.

15. A household mixer comprising an elongated base, a large and a small mixing bowl interchangeably mounted for free rotation on one end of the base, a beater unit having a horizontal electric motor and a pair of vertical beater shafts driven thereby, said unit being pivotally mounted on the opposite end of the base to move vertically about a horizontal axis extending crosswise to the longitudinal axis of the base, said beater shafts being spaced apart in a plane crosswise to said longitudinal axis, and means for effecting relative shifting in said crosswise direction between the beater unit and the bowls to position one beater in proximity to the side wall of either bowl in working position and the other beater near the center of such bowl, the combined width of the beaters approximating the radius of each bowl in working position, said parts being arranged so that the beater unit may be swung on its said pivotal mounting to vertically work the beaters back and forth from top to bottom of the mixture for working all levels thereof, both beaters simultaneously traveling into and out of the mixture, and the mixture always being worked upon at any level by the combined width of the two beaters.

16. A household mixer comprising an elongated base, a large and a small mixing bowl interchangeably mountable for free rotation on one end of the base, a pair of vertical beaters supported from the opposite end of the base on parallel axes spaced apart in a plane extending crosswise to the longitudinal axis of the base with the beater elements in overlapping relation, the beaters having a combined width approximating the radius of the large bowl, means for effecting relative shifting between the beaters and the bowls in a direction crosswise to said longitudinal axis to position the outer beater in proximity to the side wall of either bowl in working position and the other beater near the center of such bowl, and means pivotally supporting the beaters with capacity for movement vertically for working the beaters from top to bottom of the mixture in either bowl while maintaining the above-described relationship, whereby both beaters simultaneously travel into and out of the mixture and the mixture is always worked upon at any level by the combined width of the two beaters.

17. In a mixer, the combination of a base, a pair of vertical, laterally spaced, motor driven beaters supported above the base, the beaters having radially disposed blades and being arranged in such proximity that the blades alternately traverse a common area, a plurality of mixing bowls of comparatively large and small diameters, respectively, a turntable constructed for carrying any one of said bowls concentrically thereon, and means for supporting the turntable on the base to rotate about a vertical axis in any of a plurality of locations spaced apart in a plane approximately parallel with a plane connecting the spaced beater axes and with the beaters traversing substantially the full radial area of the largest as well as the smallest diameter bowl and with the outermost beater in close proximity to the inner wall of each bowl in each location, and means pivotally supporting the beaters to swing as a unit about a horizontal axis parallel with said plane, from said vertical position to an inclined position above the bowls, whereby the beaters traverse substantially said radial area at all higher elevations in the bowl.

18. In a mixer, the combination of a base, a pair of vertical, laterally spaced, motor driven beaters supported above the base, the beaters having radially disposed blades and being arranged in such proximity that the blades alternately traverse a common area, a plurality of mixing bowls of comparatively large and small diameters, respectively, a turntable constructed for carrying any one of said bowls concentrically thereon, and means for supporting the turntable on the base to rotate about a vertical axis in any of a plurality of locations spaced apart in a plane approximately parallel with a plane connecting the spaced beater axes and with the beaters traversing substantially the full radial area of the largest as well as the smallest diameter bowl and with the outermost beater in close proximity to the inner wall of each bowl in each location, and means pivotally supporting the beaters to swing as a unit about a horizontal axis parallel with said plane, from said vertical position to an inclined position above the bowls, the inner wall of each bowl being so shaped that the outermost beater traverses a path in proximity to said inner wall when swung about said horizontal axis.

19. In a household mixer, the combination of a base, a mixing bowl mounted for rotation on said base about a vertical axis, a pair of vertical beaters suitable for the culinary operations of mixing, beating, whipping, and mashing, said beaters being supported for operation in the mixing bowl on parallel axes spaced apart in a plane extending crosswise to the longitudinal axis of the base with the beater elements in overlapping relation, the beater elements having a combined width approximating the radius of the bowl and being located in cooperative relation to the bowl with one beater element in proximity to the side wall of the bowl and the other beater element in proximity to the center of the bowl whereby substantially the full body of the mixture within the level of the beater elements is carried through the same by rotation of the bowl, means for rotating the beaters at speeds for said culinary operations at all operating positions of the beaters, a pivotal support for the beaters on the base providing for pivotal movement of said beaters about a horizontal axis extending crosswise to said longitudinal axis to move the beater elements during operation back and forth from top to bottom of the mixture for working all levels thereof, both beater elements simultaneously traveling into and out of the mixture, and the mixture always being worked upon at any level by the combined width of the two beater elements in their said relationship to the mixing bowl, and means for so actuating the beaters on said pivotal support.

JOHN W. LYNCH.